Patented June 21, 1949

2,473,510

UNITED STATES PATENT OFFICE 2,473,510

STABILIZATION OF ORGANIC SUBSTANCES

George H. Denison, Jr., Oakland, and Paul C. Condit, Berkeley, Calif., assignors, by mesne assignments, to California Research Corporation, San Francisco, Calif., a corporation of Delaware No Drawing. Application February 21, 1945, Serial No. 579,169

6 Claims. (Cl. 252—45)

This invention relates to the improvement of organic substances which are susceptible to oxidation; more particularly, it relates to the stabilization of mineral lubricating oils against oxidation.

This application is a continuation-in-part of our copending application Serial No. 486,306, filed May 10, 1943 issued April 16, 1946, as United States Patent No. 2,398,416.

We have found that certain low molecular weight aliphatic selenium compounds, when added in small amount to organic substances which are subject to oxidation, strongly inhibit the oxidation of such organic substances.

The selenium compounds of the invention are aliphatic seleno ethers or monoselenides containing not more than 14 carbon atoms and having in the molecule the group

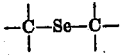

wherein the two carbons atoms shown are aliphatic carbon atoms. Examples of suitable aliphatic seleno ethers are dimethyl seleno ether ($CH_3 \cdot Se \cdot CH_3$), di-ethyl seleno ether ($C_2H_5 \cdot Se \cdot C_2H_5$)

di-n-propyl and di-isopropyl seleno ethers ($C_3H_7 \cdot Se \cdot C_3H_7$)

di-n-butyl and di-isobutyl seleno ethers ($C_4H_9 \cdot Se \cdot C_4H_9$)

di-n-amyl and di-isoamyl seleno ethers ($C_5H_{11} \cdot Se \cdot C_5H_{11}$)

di-n-hexyl and di-isohexyl seleno ethers ($C_6H_{13} \cdot Se \cdot C_6H_{13}$)

di-hepyl seleno ethers ($C_7H_{15} \cdot Se \cdot C_7H_{15}$) and dibenzyl seleno ether ($C_6H_5 \cdot CH_2 \cdot Se \cdot CH_2 \cdot C_6H_5$). Mixed seleno ethers may also be used; e. g., methyl propyl seleno ether and ethyl hexyl seleno ether. The aliphatic radicals may be alkyl, alkylene or saturated or unsaturated cycloaliphatic radicals, and the aliphatic radicals may be substituted by non-hydrocarbon groups or by aromatic groups.

Broadly stated, therefore, the invention resides in the employment, in an oxidizable organic substance, of a small amount, sufficient to inhibit oxidation, of a compound (or mixture of compounds) of the formula R—Se—R₁ wherein R and R₁ are hydrocarbon (or substituted hydrocarbon) groups containing, in toto, not more than 14 carbon atoms and wherein the attachment of each of the groups R and R₁ to the selenium is through an aliphatic carbon atom.

The preferred seleno ethers are the diamyl, dihexyl and dibenzyl seleno ethers.

The seleno ethers of the invention can be prepared by methods well known in the art. The simplest method of preparing symmetrical seleno ethers is by condensing a chlorinated hydrocarbon, such as methyl, ethyl, propyl (normal or iso), butyl (normal or iso), amyl (normal or iso), hexyl (normal or iso) or benzyl chloride with sodium selenide ($Na_2Se$).

The reaction occurring is as follows:

$$2R \cdot Cl + Na_2Se \rightarrow R \cdot Se \cdot R + 2NaCl$$

A mixture of chlorinated hydrocarbons, such as a mixture of isomeric amyl chlorides, may be used instead of a pure chlorinated hydrocarbon. Mixed seleno ethers, such as methyl propyl seleno ether ($CH_3 \cdot Se \cdot C_3H_7$) and methyl benzyl seleno ether ($CH_3 \cdot Se \cdot CH_2 \cdot C_6H_5$) can be prepared by condensing sodium hydrogen selenide (NaHSe) with a chlorinated hydrocarbon to produce a seleno mercaptan, the reaction being $$R \cdot Cl + NaHSe \rightarrow R \cdot Se \cdot H + NaCl$$

then converting the seleno mercaptan to a metal seleno mercaptide, e. g., sodium seleno mercaptide (R·Se·Na) and condensing the seleno mercaptide with a chlorinated hydrocarbon differing from that used in the first reaction, the second reaction being $$R \cdot Se \cdot Na + R' \cdot Cl \rightarrow R \cdot Se \cdot R' + NaCl$$

wherein R and R' are different radicals.

By way of example, data on the preparation of diamyl seleno ether are given below:

3 mols (319 grams) of a mixture of amyl chlorides (Sharples mixed amyl chlorides) and 1½ mols (187 grams) of sodium selenide ($Na_2Se$) were refluxed together in 1500 milliliters of 95% alcohol for 10 hours. The reaction mixture was diluted with an equal volume of water and extracted with petroleum ether. The petroleum ether was removed from the extract by heating on a steam plate and the residue (299 grams) was fractionated at 10 mm. mercury pressure into five fractions boiling as follows: (1) 182°–196° F.; (2) 197°–201° F.; (3) 202°–229° F.; (4) 231°–247° F.; (5) 247°–255° F. The first three fractions, boiling from 182° F. to 229° F., were all found to contain very nearly the same amount of selenium, which amount was very close to the theoretical selenium content of diamyl seleno ether ($C_5H_{11}$—Se—$C_5H_{11}$), which is 35.7%. The last two fractions contained substantially more selenium, or 43% and 51%, respectively. The theoretical selenium content of diamyl diselenide ($C_5H_{11}Se_2C_5H_{11}$) is 52.7%; hence, it follows that the last two fractions contained substantial amounts of diamyl diselenide, the last fraction being substantially pure diamyl diselenide.

The first three fractions were combined and the combined fractions were used as an antioxidant. This combined product is a mixture of isomeric diamyl seleno ethers, resulting from the use of a mixture of isomeric amyl chlorides in preparing the seleno ether.

The seleno ethers of the invention are in some cases effective antioxidants at concentrations as low as 0.0001%. Ordinarily, concentrations of about 0.1 to 2% will be used, but larger and smaller amounts may be used as the occasion demands. Concentrations in excess of 5% are ordinarily unnecessary, except in forming a concentrate of the seleno ether with mineral lubricating oil or other organic substance for later blending with the substance to be stabilized to produce a finished product. In such concentrates the amount of seleno ether may be as high as 50% or more.

All percentages herein stated are percentages by weight based upon total product (e. g., finished lubricant) unless otherwise stated.

The following specific example will serve to illustrate the practice and advantages of the invention:

Diamyl and dibenzyl seleno ethers were used to inhibit oxidation of a medicinal grade of white oil. The diamyl seleno ether was the mixture of isomeric diamyl seleno ethers described above. The dibenzyl seleno ether was the compound described in Beilstein's "Handbuch der Organischen Chemie," fourth edition, volume VI, page 470. The dibenzyl seleno ether had a melting point of 45.5° C. The white oil was a very highly refined mineral oil of lubricating viscosity. The diamyl seleno ether was used in the amount of 0.0568% and the dibenzyl seleno ether was used in the amount of 0.062%. The oxidation test, known as the Oxidator Test, was carried out in apparatus of the type described by Dornte in Industrial & Engineering Chemistry, vol. 28, page 26 (1936). In this test, oxygen at atmospheric pressure is bubbled through the oil, which is maintained at 340° F. The extent of oxidation of the oil is measured by the amount of oxygen absorbed by the oil, and the time in hours required for 100 grams of oil to absorb 1200 cc. of oxygen (S. T. P.) is called the "Induction period." Induction periods of base oil and inhibited oils were as follows:

| | Induction Period |
|---|---|
| Base oil | 0.05 |
| Base oil + 0.0568% diamyl seleno ether | hours 0.7 |
| Base oil + 0.062% dibenzyl seleno ether | do 1.1 |

By way of comparison, 0.1% of dicetyl thioether ($C_{16}H_{33}$—S—$C_{16}H_{33}$) gave an induction period of only 0.15 hour. The relative potencies of diamyl seleno ether, dibenzyl seleno ether and dicetyl thioether on an equimolecular basis were as follows, taking the efficacy of dicetyl thioether as unity:

| | |
|---|---|
| Dicetyl thioether | 1 |
| Diamyl seleno ether | 3.8 |
| Dibenzyl seleno ether | 6.4 |

This comparison is all the more surprising when it is considered that diamyl seleno ether (mol. wt. 221) and dibenzyl seleno ether (mol. wt. 261) are much more volatile than dicetyl thioether (mol. wt. 482), and are evaporated from the oil during the test to a much greater extent than dicetyl thioether.

The seleno ethers of the invention are also more advantageous antioxidants than the di-, tri- and other polyselenides (R—$Se_m$—$R_1$, where R and $R_1$ have the same significance as above and $m=2, 3$, etc.), in that they are more easily prepared and in that they are more stable than the aforesaid di-, tri- and higher polyselenides.

One or more seleno ethers of the invention may be used as the only added material present in an oxidizable organic substance or they may be used in conjunction with other additives. For example, the seleno ethers of the invention may be used advantageously in mineral lubricating oils in conjunction with any of the known metal salts of organic acids and/or metal salts of organo substituted inorganic acids. These salts are used to improve various properties of lubricating oils, such as detergency, stability against oxidation, film strength, etc. Examples of such metal salts are calcium, barium, zinc and aluminum salts of cetylphenol; calcium, barium, zinc and aluminum salts of diamyl diphenol monosulfide, calcium, barium, zinc and aluminum salts of mono- and dicetyl esters of phosphoric acid; calcium, barium, zinc and aluminum salts of mono- and dicetylphenyl esters of dithiophosphoric acids; calcium, barium, zinc and aluminum salts of naphthenic acids; calcium, barium, zinc and aluminum salts of oil-soluble petroleum (mahogany) sulfonic acids; calcium, barium, zinc and aluminum salts of dibutyl dithiocarbamic acid; calcium, barium, zinc and aluminum salts of reduced petroleum nitrogen base dithiocarbamates of Miller and Rutherford United States Patent No. 2,363,012. Other metals (e. g., sodium, lithium, magnesium and cobalt) and other acid radicals (e. g., aryl carboxylic acid, fatty acid, aliphatic polycarboxylic and thiophenol radicals) may be used instead of the aforementioned calcium, barium, zinc and aluminum metals and the aforementioned phenate, phenate sulfide, phosphate, thiophosphate, naphthenate, sulfonate and dithiocarbamate radicals, respectively. Thus, from 0.1 to 2% of seleno ether and from 0.1 to 2% of metal salt may be added to mineral lubricating oil, or greater amounts may be used to form a concentrate or stock solution. Further details concerning the conjoint use of seleno ethers and metal salts of organic and/or organo substituted inorganic acids in oils of lubricating viscosity, such as particular combinations of additives, results obtainable by such conjoint use, etc., may be found in our aforesaid copending application Serial No. 486,306 issued April 16, 1946 as Patent No. 2,398,416, and such details are incorporated herein by reference.

The seleno ethers of the invention may also be used advantageously in turbine lubricants and other industrial lubricants which are used to lubricate metal surfaces under conditions (such as intermixture of the lubricant with water) which promote rusting and corrosion of ferrous metal surfaces. It is now the practice to add to such lubricants both a corrosion or rust inhibitor and an antioxidant. Examples of corrosion or rust inhibitors are lauryl acid maleate and the products of condensing high molecular weight olefins with maleic anhydride and hydrating the resulting condensation product. The said olefin-maleic anhydride condensation-hydration products are described in Moser, United States Patents Nos. 2,124,628 and 2,133,734. The seleno ethers of the invention are especially advantageously used in turbine lubricants and others of the class just described, in conjunction with rust or corrosion inhibitors such as lauryl acid maleate or one of the aforesaid olefin-maleic anhydride condensation-hydration products. The seleno ethers co-operate with the rust or corrosion inhibitors to produce an oil which is both stable and rust inhibitive. Amounts of seleno ether ranging from about 0.1% or less to 2% or more and of rust or corrosion inhibitors ranging from 0.005% or less to 2% or more, preferably 0.05 to 0.5%, may be used.

Besides mineral oils of lubricating viscosity, many other oxidizable organic substances may be stabilized by the seleno ethers of the invention; for example, fats, fatty oils, rubber, mineral oil-soap greases, aldehydes, ethers, terpenes, mercaptans and phenols.

We claim:

1. A lubricant comprising a major proportion of a mineral lubricating oil which is susceptible to oxidation and a small amount, sufficient to inhibit oxidation of said lubricating oil, of a monoselenide containing not more than 14 carbon atoms and having in the molecule the structure

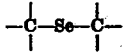

wherein both carbon atoms are aliphatic carbon atoms.

2. A lubricant comprising a major proportion of a mineral oil of lubricating viscosity and about 0.1 to 2% by weight based on finished lubricant of a dialkyl monoselenide containing not more than 14 carbon atoms.

3. The composition of claim 2, wherein said dialkyl monoselenide is diamyl seleno ether.

4. The composition of claim 2, wherein said dialkyl monoselenide is dihexyl seleno ether.

5. A lubricant comprising a major proportion of a mineral oil of lubricating viscosity and about 0.1 to 2% by weight based on finished lubricant of dibenzyl monoselenide.

6. A composition of matter comprising a major proportion of a normally liquid organic material of lubricating viscosity which is susceptible to atmospheric oxidation and deterioration and, dissolved therein, a small amount, sufficient substantially to inhibit said oxidation and deterioration, of a monoselenide containing not more than fourteen carbon atoms and having in the molecule the structure

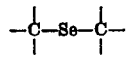

wherein both carbon atoms are aliphatic carbon atoms.

GEORGE H. DENISON, JR.
PAUL C. CONDIT.

REFERENCES CITED

The following references are of record in the file of this patent:

UNITED STATES PATENTS

| Number | Name | Date |
| --- | --- | --- |
| 1,539,722 | De la Riboisiere | May 26, 1925 |
| 1,575,436 | Midgley, Jr. | Mar. 2, 1926 |
| 2,128,109 | Wiezevich | Aug. 23, 1938 |
| 2,158,668 | Rosen | May 16, 1939 |
| 2,236,897 | Davis | Apr. 1, 1941 |
| 2,295,053 | Rosen | Sept. 8, 1942 |
| 2,359,270 | Shutt | Sept. 26, 1944 |

OTHER REFERENCES

Journal Chem. Ed. vol. 12, pages 363–366 (1935).
Proc. Indiana Acad. Sci., vol. 43, pages 72–98 (1934).
Chemical Abstracts, vol. 37, page 84.
Chemical Abstracts, vol. 36, page 3466.

Certificate of Correction

June 21, 1949.

Patent No. 2,473,510.

GEORGE H. DENISON, Jr., ET AL.

It is hereby certified that errors appear in the printed specification of the above numbered patent requiring correction as follows:

Column 5, line 42, claim 3, and column 6, line 1, claim 4, for "seleno ether" read *monoselenide*; same column 6, line 6, beginning with "6. A composition of matter" strike out all to and including the word and period "atoms." in line 19, comprising claim 6; in the heading to the printed specification, line 9, for "6 Claims" read *5 Claims*; and that the said Letters Patent should be read with these corrections therein that the same may conform to the record of the case in the Patent Office.

Signed and sealed this 29th day of November, A. D. 1949.

[SEAL]

THOMAS F. MURPHY,
*Assistant Commissioner of Patents.*